United States Patent [19]

Kuhn

[11] 4,453,374
[45] Jun. 12, 1984

[54] QUICK-RELEASE SHIELD MOUNTING

[75] Inventor: John B. Kuhn, Mayville, Wis.

[73] Assignee: Deere & Company, Moline, Ill.

[21] Appl. No.: 413,909

[22] Filed: Sep. 1, 1982

[51] Int. Cl.³ .................. A01D 35/12; A01D 67/02
[52] U.S. Cl. .................................. 56/320.1; 56/17.4
[58] Field of Search ............... 56/17.4, 17.2, 320.1, 56/DIG. 22; 292/259; 16/373, 225, 374, 387; 220/326, 315; 267/164; 24/248 R, 252 R, 261 R

[56] References Cited

U.S. PATENT DOCUMENTS

| 629,977 | 8/1899 | Barber | 220/315 |
|---|---|---|---|
| 1,189,173 | 6/1916 | Peterson | 292/259 |
| 1,488,700 | 4/1924 | Nelson | 292/259 |
| 3,043,082 | 7/1962 | Northcote et al. | 56/320.1 |
| 3,568,421 | 3/1971 | Smith et al. | 56/17.4 |
| 3,901,003 | 8/1975 | Erdman | 56/320.1 |

Primary Examiner—Gene Mancene
Assistant Examiner—John Weiss

[57] ABSTRACT

A shield for a rotary mower blade drive is received on locating dowels fixed to the blade housing and are retained thereon by a pair of U-shaped latch rods that are either vertically pivotally mounted to the shield or vertically pivotally mounted to the housing. In the case where the rods are carried by the shield, they are located beneath gauge wheel support members which are fixed to the housing and have recesses which receive the rods when the latter are in upright, resiliently deflected conditions wherein they bias the shield against the blade housing. In the case where the rods are carried by the housing, the shield has raised portions which define recesses which receive the rods when the latter are in upright, resiliently deflected conditions wherein they bias the shield against the blade housing. In both cases, the shields are properly located by dowels or pins fixed to the housing.

5 Claims, 5 Drawing Figures

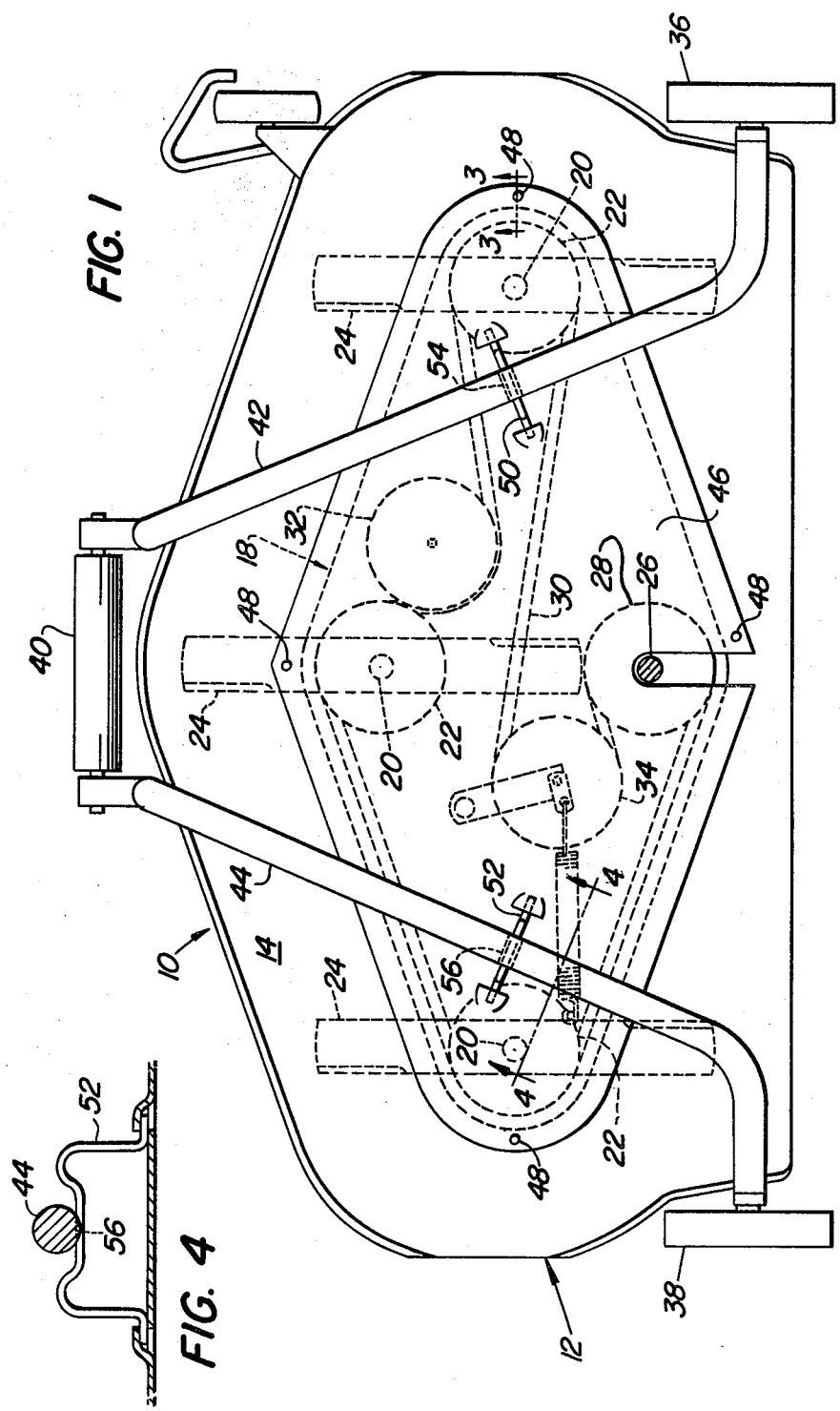

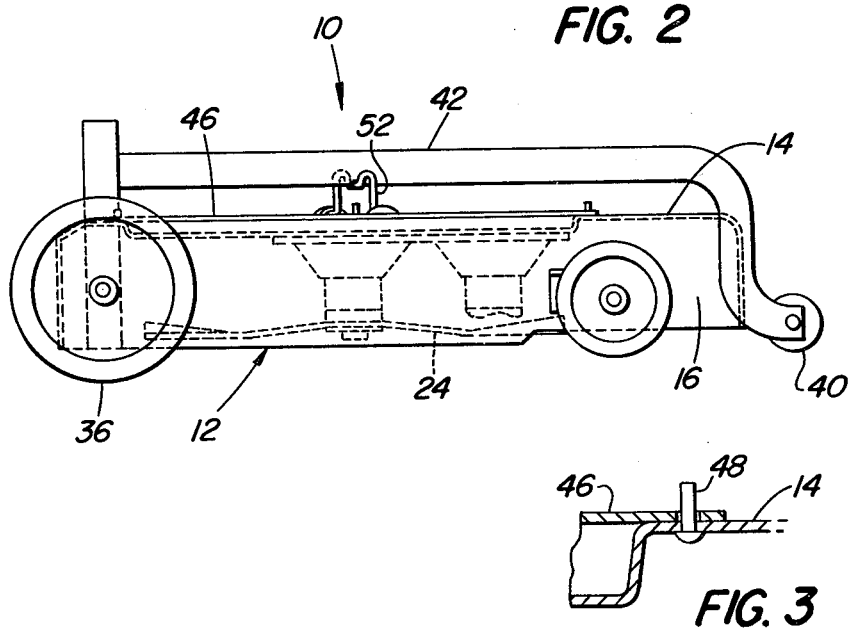
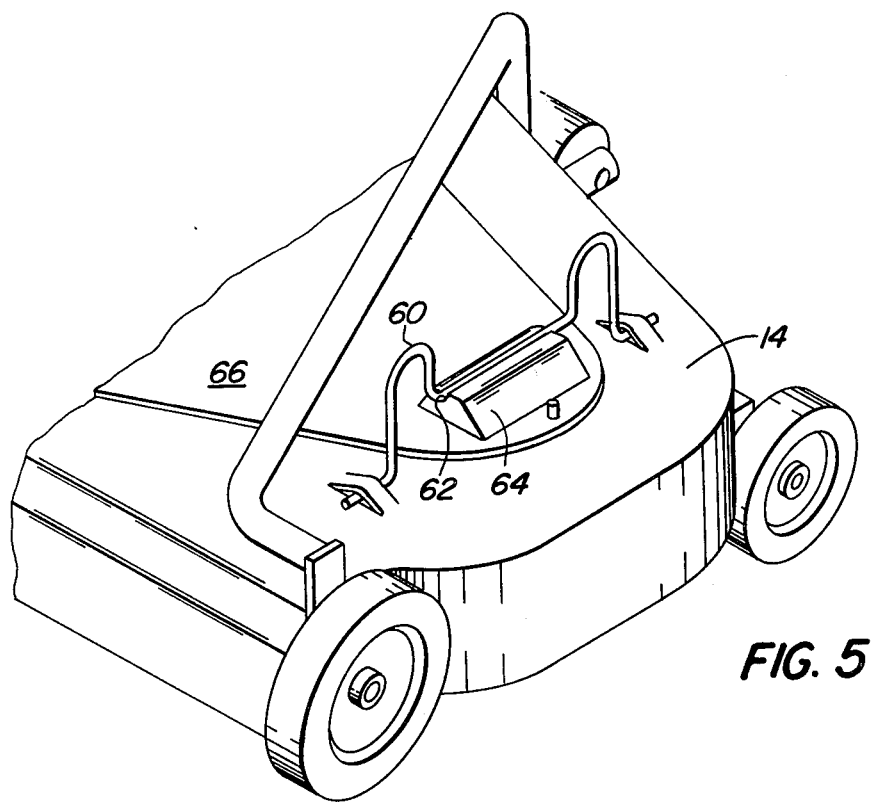

QUICK-RELEASE SHIELD MOUNTING

BACKGROUND OF THE INVENTION

The present invention relates to shields for mower drives and more specifically relates to shields for drives that are supported by a mower blade housing or deck.

Mower housings or decks normally have shields mounted to the tops thereof for preventing a person from placing his hands into the drive mechanism and for preventing brush and the like from causing drive belts to be damaged or dislodged from their pulleys. These shields are removable to permit accumulation of grass and other debris to be cleaned from beneath the shields and to permit service of the drive mechanisms. The most common method of holding the shields in place is to provide several nuts or bolts, the removal and installation of which is time consuming. A quick-release shield mounting is known which employs a rubber hold-down strap, however, such straps age, lose their resiliency and eventually fail.

SUMMARY OF THE INVENTION

According to the present invention there is provided an improved quick-release mounting for a drive shield of a mower. Specifically, the invention includes a pair of bail-like, U-shaped latch rods which in a first embodiment are vertically pivotally mounted to the drive shield and in a second embodiment are vertically pivotally mounted to the mower blade housing. The pair of latch rods of the first embodiment are respectively located below a pair of gauge wheel support members which are fixed to a blade housing or deck of the mower. The support members are respectively provided with downwardly opening notches or receptacles which respectively receive bight portions of the latch rods when the latter are in upright deflected conditions wherein they bias the shield downwardly. The shields of the second embodiment are provided with a pair of raised portions which define upwardly opening recesses which respectively receive bight portions of the latch rods when the latter are in upright deflected condition wherein they bias the shield downwardly. The shields of both embodiments are kept properly located by pins fixed to the housing and received therein.

A broad object of the invention is to provide a quick-release drive shield mounting which is of a simple, durable and effective construction.

Another object of the invention is to provide a drive shield mounting which eliminates the use of screw or bolt fasteners yet retains the shield in place in a secure, rattle-free condition.

A more specific object is to provide a drive shield mounting including at least one U-shaped, resilient latch rod vertically pivotally mounted either on the shield or on the blade housing and pivotable to an upright position wherein the bight portion thereof is either received in a notch located in a support member overlying the shield or in a recess provided in a raised portion of the shield and with the legs thereof being resiliently deflected so as to exert a downward force on the shield.

These and other objects will become apparent from a reading of the ensuing description together with the appended drawing.

BRIEF DESCRIPTION OF THE DRAWING

FIG. 1 is a top plan view of a multiple spindle rotary mower embodying a drive shield mounting constructed in accordance with the principles of the present invention.

FIG. 2 is a right side view of the mower shown in FIG. 1.

FIG. 3 is a vertical sectional view showing the drive shield in place on one of the locating pins.

FIG. 4 is a vertical sectional view taken along line 4—4 of FIG. 1, showing a latch rod in its operative position.

FIG. 5 is a somewhat schematic perspective view showing an alternate form of the invention wherein a hold-down latch is carried by the blade housing and received in an upwardly opening recess provided in the shield.

DESCRIPTION OF THE PREFERRED EMBODIMENT

Referring now to FIGS. 1 and 2 therein is shown a multiple spindle, rotary mower 10 having a blade housing or deck 12 including a top 14 and a skirt 16 depending from the periphery of the top. A mower drive 18 is supported in a dished portion of the top 14 and includes three drive spindles 20 rotatably supported at spaced locations across the top. The spindles 20 extend above the below the top, and mounted on their upper and lower ends are belt pulleys 22 and blades 24, respectively. Mounted centrally on the rear of the housing is a gearbox (not shown) having an input shaft projecting forwardly therefrom and an output shaft 26 projecting vertically and having a drive pulley 28 fixed thereto. A drive belt 30 is engaged with the pulleys 22, the pulley 28, a fixed idler pulley 32 and a biased, horizontally swingable idler pulley 34. The drive just described is intended to only exemplify the type of drive with which the drive shield mounting of the present invention is particularly adapted for use. Cooperating with the housing 14 as part of the support structure for the mower blades 24 and maintaining the blades at a preselected minimum distance from the ground is a gauging assembly comprising a pair of gauge wheels 36 and 38 located at opposite rear corners of the housing 12 and a gauge roller 40 located centrally and forwardly of the housing. The wheels 36 and 38 are respectively mounted to outturned rear end portions of a pair of support members 42 and 44 which are fixed to and angle forwardly across the housing 12, with the roller 40 extending between and being rotatably mounted to respective forward ends of the members 42 and 44.

A drive shield 46 is provided over the various drive and idler pulleys and the drive belt so as to prevent someone from accidentally placing their hands into the drive and for preventing brush and the like from entering between the belt and the pulleys such as to cause the belt to become dislodged from the pulleys. The shield 46 is properly positioned by four locating dowels or pins 48 fixed to the housing top 14, adjacent its dished portion, at central, forward and opposite side locations, the dowels 48 being received in holes provided in the shield. A pair of U-shaped shield latch rods 50 and 52 are respectively vertically pivotally connected to the shield 46 at locations beneath the support members 42 and 44 cooperate therewith to maintain the shield 46 in place on the dowels 48. Specifically, legs of each of the latch rods include oppositely outturned ends pivotally received in receptacles formed by lancing the shield 46. Respective resilient deflectable central or bight portions join the legs of the latch rods 50 and 52 and are received in notches or recesses 54 and 56 provided in the undersides of the members 42 and 44, with the latch rods then being upright and resiliently deflected whereby they bias the shield 46 downwardly against the housing top 14. The latch rods 50 and 52 may be forcibly pivoted from the notches 54 and 56 so as to permit the shield to be lifted off the dowels 48 when it is desired to service the drive 18 or to clean out debris which has accumulated beneath the shield. It is to be noted that once the latch rods 50 and 52 are dislodged from the notches 54 and 56, they afford lift handles which may be grasped to manipulate the shield.

Referring now to FIG. 5, therein is shown an alternate embodiment wherein a generally U-shaped latch rod 60 is shown vertically pivotally mounted to the housing top 14 and having a resilient deflectable central or bight portion received in a notch or recess 62 provided in an upper surface of a raised portion 64 formed in a drive shield 66. The bight portion of the latch rod 60 has respective offset portions at its opposite ends which permit the bight portion to be resiliently deflected to permit it to be moved into position in the recess of the raised portion 64.

The operation of the invention is thought to be clear from the foregoing description. Suffice it to say that the latch rods of the two embodiments described provide quick-release shield latches which are of a simple and reliable construction.

I claim:

1. In combination with a power transmission device comprising a plurality of drive elements rotatably mounted on a mower blade housing and covered by a drive shield, and at least one gauge element support secured to the housing and extending above said drive shield, the improvement comprising: a quick-release latch means including at least one elongate member having a resiliently deflectable central portion joining first and second ends with the ends being connected to said shield; and recessed surface means rigidly fixed to said gauge element support and located relative to said member such that the latter is resiliently deflected in a direction urging the shield toward the housing when said central portion of the member is received in said recessed surface means.

2. The combination defined in claim 1 wherein said housing and shield further include mating surface means for locating said shield on said support structure.

3. The combination defined in claim 2 wherein said mating surface means comprises dowels fixed to said housing and holes provided in the shield and received on said dowels.

4. The combination defined in claim 1 wherein said member is in the form of a U-shaped rod having opposite legs pivotally connected to the shield and having a bight portion disposed in engagement with said recessed surface means when the rod is in a resiliently deflected condition wherein it urges the shield against the housing.

5. In a mower including a support structure formed in part by a blade housing and in part by a pair of laterally spaced gauge element supports including intermediate portions extending generally horizontally above a releasable shield covering a mower blade drive means mounted to the housing, the improvement comprising: a plurality of upwardly extending projections fixed to the blade housing peripherally of a zone encompassing said drive means; said shield having a plurality of receptacles therein received on a respective projection, first and second downwardly opening recesses respectively located in the undersides of the intermediate portions of the pair of gauge element supports; and first and second resilient U-shaped rods respectively located beneath said first and second recesses and each having opposite ends vertically pivotally mounted to said shield; and said first and second rods having respective bight portions releasably engaged with the first and second recesses when the rods are in a substantially vertical upright position; and said rods being dimensioned such that they are deflected and urge the shield downwardly when they are received in said recesses.

* * * * *